(12) United States Patent
Li

(10) Patent No.: US 9,069,775 B2
(45) Date of Patent: Jun. 30, 2015

(54) METHODS AND DEVICES FOR GENERATING DIRECTORIES

(71) Applicant: Chunyu Li, Beijing (CN)

(72) Inventor: Chunyu Li, Beijing (CN)

(73) Assignees: Peking University Founder Group Co., Ltd., Beijing (CN); Beijing Founder Apabi Technology Ltd., Beijing (CN)

( * ) Notice: Subject to any disclaimer, the term of this patent is extended or adjusted under 35 U.S.C. 154(b) by 214 days.

(21) Appl. No.: 13/731,732

(22) Filed: Dec. 31, 2012

(65) Prior Publication Data

US 2013/0173670 A1 Jul. 4, 2013

(30) Foreign Application Priority Data

Dec. 30, 2011 (CN) .......................... 2011 1 0457702

(51) Int. Cl.
*G06F 17/30* (2006.01)
*G06F 17/27* (2006.01)

(52) U.S. Cl.
CPC ........ *G06F 17/3007* (2013.01); *G06F 17/2745* (2013.01)

(58) Field of Classification Search
CPC .................. G06F 21/10; H04L 43/02
See application file for complete search history.

(56) References Cited

U.S. PATENT DOCUMENTS

| 6,415,295 B1* | 7/2002 | Feinberg ............................. 1/1 |
| 6,549,916 B1* | 4/2003 | Sedlar ................................. 1/1 |
| 2013/0014258 A1* | 1/2013 | Williams ........................ 726/24 |
| 2014/0156790 A1* | 6/2014 | Gopal et al. .................. 709/217 |

* cited by examiner

*Primary Examiner* — Sherief Badawi
*Assistant Examiner* — Courtney Harmon
(74) *Attorney, Agent, or Firm* — Finnegan, Henderson, Farabow, Garrett & Dunner, LLP

(57) ABSTRACT

A method and a device for directory generation are provided in the present disclosure. The method comprises searching a directory byte stream in a text file. The directory byte stream includes a predetermined directory key byte corresponding to a predetermined directory character. The method also comprises generating a directory of the text file based on the directory byte stream.

10 Claims, 1 Drawing Sheet

METHODS AND DEVICES FOR GENERATING DIRECTORIES

CROSS REFERENCE OF RELATED APPLICATION

This application claims the benefits of priority to Chinese Patent Application No. 201110457702.9, filed on Dec. 30, 2011, the entire contents of which are incorporated herein by reference.

TECHNICAL FIELD

The present disclosure relates to mobile reading, and more particularly, to methods and devices for directory generation.

BACKGROUND

A TXT format text file, such as a novel in TXT format, is popular in the field of mobile reading due to its compact file size and wide equipment compatibility. Most TXT text files, such as TXT novels, however, do not have general directories, limiting the ability to quickly locate contents and jump over sections of text in the file during reading process. Existing methods for generating a directory for a TXT text file are based on character matching, i.e., by means of matching all characters in the TXT text file with target characters (such as Chapter X, Article X, etc.). Such methods require conversion of all byte streams in the file into a character string prior to the matching, which is time consuming and inconvenient. Therefore, it is desirable to develop a method and a device to generate a directory rapidly and efficiently. This is especially important in a mobile computing environment because the computing capacity and memory capacity of a mobile apparatus are usually limited.

SUMMARY

The disclosed embodiments involve a method for generating a directory. The method may comprise searching a directory byte stream in a text file. The directory byte stream may include a predetermined directory key byte corresponding to a predetermined directory character. The method may also comprise generating a directory of the text file based on the directory byte stream.

The disclosed embodiments also involve a device for generating a directory. The device may comprise a directory byte stream searching module configured to search a directory byte stream in a text file. The directory byte stream may include a predetermined directory key byte corresponding to a predetermined directory character. The device may also comprise a directory generating module configured to generate a directory of the text file based on the directory byte stream.

The preceding summary and the following detailed description are exemplary only and do not limit the scope of the claims.

BRIEF DESCRIPTION OF THE DRAWINGS

The accompanying drawings, which are incorporated in and constitute a part of this specification, in connection with the description, illustrate various embodiments and exemplary aspects of the disclosed embodiments. In the drawings.

DESCRIPTION OF THE EXEMPLARY EMBODIMENTS

Reference will now be made in detail to exemplary embodiments, examples of which are illustrated in the accompanying drawings. When appropriate, the same reference numbers are used throughout the drawings to refer to the same or like parts.

Figure 1:
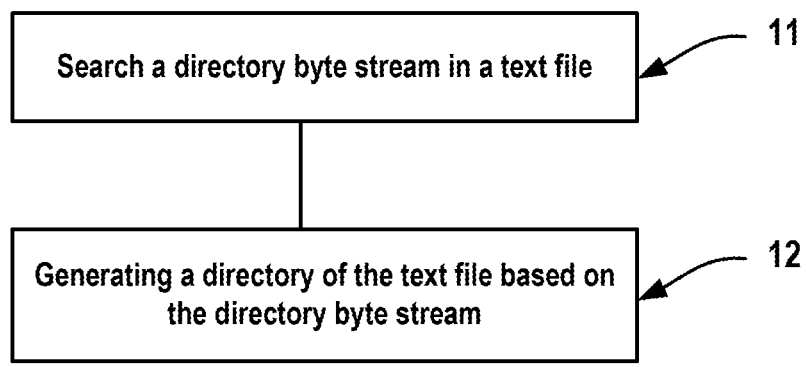
FIG. 1 is a flow diagram illustrating an exemplary method for directory generation, consistent with certain disclosed embodiments.

FIG. 1 is a flow diagram illustrating an exemplary method for directory generation, consistent with some disclosed embodiments. The method may be implemented by a computer, such as executing computer programs by a computer. The computer may include a processor and a memory that is communicatively connected with the processor.

In step 11, the method may comprise searching a directory byte stream in a text file. In some embodiments, the search may be performed for all bytes in the text file. The directory byte stream may include a predetermined directory key byte corresponding to a predetermined directory character.

In step 12, a directory of the text file may be generated based on the directory byte stream. In some embodiments, step 11 may obtain a plurality of directory byte streams and the directory may be generated based on all the directory byte streams which have been searched out and obtained.

In some embodiments, a directory may be obtained by matching bytes of the text file without converting the bytes into characters and then matching the characters. Thus, the requirement for computing capacity and/or memory capacity may be reduced, and the speed for extracting and generating the directory may be increased.

In some embodiments, the disclosed method can be applicable for extracting and generating directories for text files in various languages. Taking Chinese as an example, directory character streams may include "第X章X章", "第X章第Y篇", etc. In some embodiments, one or more directory characters, such as "第", "章", "篇" etc., may be predetermined, and bytes corresponding to these predetermined directory characters, e.g., directory key bytes, may be determined The directory of the text file may be obtained by searching corresponding directory byte streams from the text file according to these directory key bytes.

In some embodiments, the step of searching a directory byte stream may include the following steps.

In step 21 (not shown), L bytes starting from the first byte of the text file can be fetched into a cache comprising L storage spaces with addresses $A_1$-$A_L$, respectively, wherein each byte may be stored in one of the storage spaces and L is a predetermined positive integer.

In step 22 (not shown), a predetermined separator byte may be searched in the bytes currently stored in the cache. Two adjacent predetermined separators may be searched and obtained. Whether a byte stream between the two adjacent predetermined separator bytes contains the directory byte stream can be determined. When it is determined that the byte stream between the adjacent predetermined separator bytes contains the directory byte stream, the address $A_N$ of the storage space corresponding to the last predetermined separator byte may be determined, and the bytes in the storage spaces with addresses $A_N$-$A_L$ may be moved into the storage spaces with addresses $A_1$-$A_{L-N+1}$ in the cache, where N is a positive integer and $1 \leq N \leq L$.

In step 23 (not shown), N−1 bytes, which have not been fetched in to the cache, can now be fetched from the text file and stored in addresses $A_{L-N+2}$-$A_L$ in the cache. The process may then go back to step 22 until all bytes in the text file have been fetched into the cache and the searching for the directory byte stream has been performed in all the bytes.

In some embodiments, bytes may be fetched in batches from bytes of the text file into the cache by a computer. The fetched bytes can be respectively stored into the storage spaces with addresses $A_1$-$A_L$ in the cache. In a text file, a separator may generally be used to divide contents of the text file into different directory levels or paragraphs. Thus, searching the directory byte stream can be implemented by searching one or more bytes corresponding to the separator (hereafter simply referred to as a separator byte) in the cache and analyzing the contents of the byte streams between two adjacent separator bytes. In some embodiments, the specific character used as the separator in the text file may be unknown in advance. In some embodiments, a plurality of separators having different priority levels, such as a Carriage Return Line Feed, a Tab character, etc., may be provided in advance. During the searching process, the separator byte corresponding to a separator having a higher priority level (such as the Carriage Return Line Feed) may be chosen to be searched first. If it is determined that the space of the cache is big enough and the separator byte has not been searched out in the bytes previously fetched into the cache, the separator byte corresponding to a separator having a lower priority level (such as the Tab character) may be searched until it is determined that the separator is actually used in the text file. On the other hand, if it is determined that the space of the cache is not big enough and the separator byte has not been searched out in the bytes previously fetched therein, a larger storage space of cache may be requested to the processing unit of the apparatus and then bytes of the text file may be fetched therein again for processing.

In some embodiments, in the above-described step 22, the step of determining whether the byte stream between adjacent predetermined separator bytes contains the directory byte stream may include searching the directory key byte in the byte stream between adjacent predetermined separator bytes. If the directory key byte has been searched out, the byte stream between adjacent predetermined separator bytes can be determined as the directory byte stream.

It is noted that the method of searching the directory key byte in the byte stream between adjacent predetermined separator bytes is not limited. Different methods may be utilized based on particular apparatus and/or text files. For example, the predetermined directory characters may be classified into a main-directory character and a sub-directory character according to expressions of the directory character streams used in the text file. Accordingly, a main-directory key byte and a sub-directory key byte may be obtained. When searching the directory key bytes in the byte stream between adjacent predetermined separator bytes, the main-directory key byte may be searched first. If the main-directory key byte has been searched out, then the sub-directory key byte may be searched among the bytes following the main-directory key byte. If the sub-directory key byte has also been searched out, the byte stream between adjacent predetermined separator bytes can be determined as the directory byte stream. Taking Chinese as an example, "第X章", "第X 章第Y 篇", etc., are generally used as directory character streams in a text file. Assuming that predetermined directory characters are "第", "章", and "篇", the character "第" may be determined as the main-directory character, while the characters "章" and "篇" may be determined as the sub-directory characters. Assuming that the main-directory key byte corresponding to main-directory character "第" is "m1" and the sub-directory key bytes corresponding to sub-directory characters "章" and "篇" are "m2" and "m3", respectively, the byte "m1" may be searched first in the byte streams between adjacent predetermined separator bytes. The searching may be completed if "m1" has not been searched out; otherwise, if "m1" has been searched out, "m2" and "m3" can be searched from the byte immediately following "m1" (or from the byte following "m1" but separated from "m1" by one byte). If "m2" or "m3" has been searched out, the byte stream between currently adjacent predetermined separator bytes can be determined as the directory byte stream.

In some embodiments, in step 22, whether the byte stream between adjacent predetermined separator bytes is the directory byte stream may be determined only when a total number of bytes corresponding to the byte stream is larger than a maximum number of directory bytes. The maximum number of directory bytes may be equal to a product of a pre-estimated maximum number of characters contained in a directory character stream and a maximum number of bytes corresponding to a single character in the text file.

In some embodiments, the total number of characters in the directory character stream used in the text file may have an upper limit. Taking Chinese as an example, when the directory character stream used in the text file is "第X章" or "第X 章第Y 篇", the total number of characters is usually no more than 50 words, because a character stream having more than 50 characters is generally a content character stream of the text file, rather than a directory character stream. Base on such knowledge, the total number of the bytes corresponding to directory character streams having a maximum number of characters (hereafter simply referred to as the maximum number of directory byte) may be determined. When searching the directory byte stream in the bytes in the cache, a byte stream between adjacent predetermined separator bytes with characters more than the maximum number of directory bytes may be omitted. Here, the maximum number of directory byte may be determined by means of estimating. First, the maximum total number of characters of the directory character stream commonly used in the text file and the maximum number of bytes corresponding to one character in current text file (for fixed length coding, the number of bytes corresponding to a character is a constant value; while for variable length coding, the number of bytes corresponding to a character is variable and the maximum value thereof is taken herein) may be estimated. Then, a product of the maximum total number of characters of the directory character stream and the maximum number of bytes corresponding to one character may be determined as the maximum number of directory byte. For example, assuming that the maximum total number of characters of the directory character stream in the text file is 50 and the maximum number of bytes corresponding to a character is 2, the maximum number of directory byte is 100. Thus, when the directory byte stream is searched among the bytes in the cache, a byte stream between adjacent predetermined separator bytes whose total number of bytes exceeds 100 may be omitted. In other words, the byte stream between adjacent predetermined separator bytes whose total number of bytes exceeds 100 may not be determined as the directory byte stream. By employing this strategy, the speed for extracting directory may be greatly improved.

In some embodiments, in step 11 (FIG. 1), whenever a directory byte stream is searched out during the searching of the directory byte stream, a preset number of bytes following the directory byte streams may be skipped, and then searching of the directory byte stream may be performed in the remaining bytes of the text file.

In some embodiments, during the fetching of bytes of the text file into the cache, whenever a directory byte stream is searched out from the cache, if a total number of the bytes following the directory byte stream in the cache is larger than the preset number, the searching of directory byte stream is performed after the preset number of the bytes following the directory byte stream in the cache may be skipped.

On the other hand, whenever a directory byte stream is searched out from the cache, if the total number of the bytes following the directory byte stream which is just searched out in the cache is smaller than the preset number by Y, Y bytes may be skipped and L bytes may be fetched into the cache after Y bytes in the bytes which have not been fetched from the text file, wherein Y is a positive integer. The searching of the directory byte stream in the cache may continue.

In some embodiments, the total number of characters in a content character stream in the text file may have a lower limit. For example, for most text files, the total number of content characters under one level of the directory is generally no less than 500. Base on such knowledge, it is possible to estimate the lower limit of the total number of bytes of a content character stream in the text file and determine the number of bytes corresponding to the lower limit as a preset number. Thus, whenever a directory byte stream is searched out from the cache, the preset number of bytes following the directory byte stream may be directly skipped (being read out but not fetched into the cache) and then the searching of the directory byte stream may continue.

In some embodiments, since the preset number is an estimated value, it is possible that the next level of the directory may be accidentally skipped without being searched out. In order to avoid this situation, when the first Q (Q is an integer) directory byte streams are extracted from the text file, the preset number of the bytes may not be skipped. Then, the minimum number min of bytes contained between adjacent two directory byte streams in the Q directory byte streams can be determined. From the (Q+1)th directory byte steam, min bytes may then be skipped when a directory byte stream is identified.

In some embodiments, the method may further include the step of determining an offset from the directory byte stream which has been searched out to the first byte of the text file for each directory byte stream which has been searched out.

In some embodiments, when the directory byte stream is searched in all the bytes of the text file, the offset from the directory byte stream to the first byte of the text file may be determined each time a directory byte stream is searched out, so that corresponding text contents may be rapidly located when the directory of the text file is generated.

In some embodiments, when bytes of the text file are fetched into the cache, the step of determining the offset may further include the following steps.

Whenever a directory byte stream has been searched out in the cache, a total number S of the bytes in the text file which have been currently fetched can be determined, wherein S is a positive integer. An address $A_M$ of the storage space corresponding to the first byte of the directory byte streams currently stored in the cache may also be determined, wherein M is a positive integer and $1<M<L$. The offset from the directory byte stream which has been searched out to the first byte of the text file may then be determined as $S-(L-M)$.

In some embodiments, in step 12 (FIG. 1), the step of generating the directory of the text file may include the following steps.

When all the directory character streams corresponding to all the directory byte streams have been searched out and determined, the directory of the text file may be generated according to the directory character streams.

In some embodiments, prior to the step of generating the directory of the text file, the method may further include the following steps. An erroneous directory character stream from the directory character streams can be filtered and removed to obtain filtered directory character streams, and the directory of the text file can be generated according to the filtered directory character streams.

In some embodiments, the step of filtering the erroneous directory character stream may include the following steps. A constant corresponding to each predetermined directory character may be determined, wherein different directory characters may correspond to different constants. For each of the directory character streams, a set of constants $\{E_i|i=1, 2, 3 \ldots\}$ corresponding to all the predetermined directory characters contained therein may be determined, wherein i is a sequence number of each of the predetermined directory character in the directory character stream, and $E_i$ is the constant corresponding to the i-th matched directory character in the directory character stream.

For each of the directory character streams, a calculation value W corresponding to the directory character stream may be calculated by employing the following equation:

$$W = E1 + E2 \times pow(2, \text{delta}) + \ldots + Ei \times pow(2, \text{delta} \times (i-1)),$$

wherein pow is an exponential operation, and delta is an operational factor.

A sequence of the calculation values corresponding to all the directory character streams may be obtained and then the sequence of the calculation values may be divided into preset intervals.

A number of the calculation values in each of the intervals may be determined. For an interval in which the number of the calculation values in the interval is smaller than a set threshold value, the directory character stream corresponding to the calculation values in the interval may be determined as an erroneous directory character stream, and then the erroneous directory character stream can be filtered and removed.

For example, a constant corresponding to each predetermined directory character may be determined so that characters in various languages are mapped to numerals to facilitate the classification analysis by the apparatus. For example, predetermined directory characters such as "第", "章", "节", "篇", and "回" may be mapped to constants 10, 20, 30, 40, and 50, respectively. Then, for each of the directory character streams, a set of constants corresponding to all the predetermined directory characters contained therein may be determined. By using each constant in the set, a calculation value W related to the current directory character stream may be obtained. Furthermore, in order to avoid the situation that a same calculation value is calculated for different character streams with same predetermined directory characters in different locations (such as character streams {第5章2篇} and {第二篇文章的启示}), the location of each of the predetermined directory characters in each of the directory character streams may also be considered when calculating the related calculation values W. In the above equation, pow(2, delta×(i−1)) is a weighting coefficient of each of the predetermined directory characters in the directory character stream, wherein pow refers to an exponential operation, i is a sequence number of each of the predetermined directory characters in the directory character stream, and delta is an operational factor for increasing differences of calculation values corresponding to each of the directory character stream so as to divide the calculation values into preset intervals. In some embodiments, the value of delta may be taken according to actual experience. Note that, if the value of delta is too large, the calculation value W may also be too large in length thereby causing the storage to be insufficient.

When the calculation values corresponding to most of the directory character streams calculated by employing the above equation may be nearly the same (or in a same interval with little variation range), these directory character streams may be directory character streams formed in a same or similar manner. For example, calculation values corresponding to the directory character streams {第1回}, {第2回}, ..., {第20回} are similar with each other. On the other hand, calculation values corresponding to a few special directory character streams may be much different from those corresponding to most of other directory character streams. These directory character streams may be the erroneous directory character streams, such as {第二篇文章的启示}, {第三次比赛回合中}, {第一次我们有了新的篇章}, etc. In some embodiments, after the calculation values have been divided into the preset intervals, a percentage of the number of calculation values in each interval with respect to the total number of calculation values may be calculated. The directory character streams corresponding to intervals in which the percentage is smaller than a preset threshold value may be determined as the erroneous directory character streams.

An exemplary method for directory generation is provided below to extract and generate a directory of a TXT text file. Assume that language of the TXT text file is Chinese, a predetermined main-directory character is "第" whose corresponding main-directory byte is "m1", sub-directory characters are "章", "节", "篇", "回" and "集" whose corresponding sub-directory bytes are respectively "m2", "m3", "m4", "m5" and "m6", respectively. In addition, assume that a predetermined separator is a character of Carriage Return Line Feed, the byte corresponding to the character of Carriage Return is "0X0D" and the byte corresponding to the character of Line Feed is "0X0A". Then the predetermined separator byte is "0X0D, 0X0A".

The exemplary method may include the following steps.

In step 31 (not shown), a cache which contains 1024 one-dimensional arrays may be requested for, and 1024 bytes from the first byte of the TXT text file may be fetched into the cache.

In this step, the character coding type of the text file may be determined first based on a lead code born of the TXT text file (if born does not exist, then determined based on contents of the 1024 byte stream of the TXT text file). Assuming that the character coding type of the text file is UTF-8 code, the maximum number of bytes corresponding to one single character in the text file is 5. In addition, the number of characters in a directory character stream can be estimated to be no more than 50 such that the maximum number of directory bytes is calculated as 250 in the case.

In step 32 (not shown), a predetermined separator byte may be searched among the bytes currently stored in the cache, and it can be determined that whether a byte stream between adjacent predetermined separator bytes is a directory byte stream. If it is the case, it is determined that a directory byte stream has been searched out.

Assuming that the byte stream currently fetched into the cache is {W1, W2, ..., Wd, 0X0D, 0X0A, X1, X2, ..., Xa, 0X0D, 0X0A, Y1, ..., Yb, 0X0D, 0X0A, Z1, ..., Zc}, step 32 may further include the following steps.

In step 32_1, "0X0D, 0X0A" may be searched in the current cache. IF "0X0D, 0X0A" has been searched out, it can be determined whether the byte stream {X1, X2, ..., Xa} between the first byte "0X0D, 0X0A" and the second byte "0X0D, 0X0A" is a directory byte stream.

First, a main-directory byte "m1" can be searched in this byte stream. If "m1" has been searched out, sub-directory bytes "m2", "m3", "m4", "m5", and "m6" may be searched among the bytes following "m1" in the byte stream. If any one of the sub-directory bytes has been searched out, the byte stream may be determined as containing the directory byte stream. On the other hand, if the main-directory byte "m1" has not been searched out in this byte stream or any one of the sub-directory bytes has not been searched out, then the step turns to the next byte stream (a byte stream between the bytes corresponding to the next adjacent character of Carriage Return Line Feed). Assuming that byte stream {X1, X2, ..., Xa} is determined as containing the directory byte stream, an address of cache storage space corresponding to the first byte X1 in current directory byte stream is 35, and the total number of bytes which have been read into the TXT text file is 2450, then an offset from the current directory byte stream to the first byte of the text file can be determined as 2450−(1024−35)=1461.

In step 32_2, after the third byte "0X0D, 0X0A" has been searched out, the total number of the bytes contained in byte stream {Y1, ..., Yb} between the second byte "0X0D, 0X0A" and the third byte "0X0D, 0X0A" can be determined as 795 and thus the byte stream {Y1, ..., Yb} may be skipped directly without determining whether it is a directory byte stream.

In step 32_3, when the third byte "0X0D, 0X0A" currently searched out in the cache is determined as the last one, step 32 is completed and the procedure may go to step 33.

In step 33 (not shown), it may be determined that the third byte "0X0D, 0X0A" currently searched out in the cache is the last "0X0D, 0X0A" byte and the addresses of cache storage space corresponding to this "0X0D, 0X0A" are 993 and 994. Then the bytes stored in the arrays whose current addresses are 995-1024 (total 29 arrays) in the cache may be stored into the arrays whose address are 1-29 in the cache.

In step 34 (not shown), 994 bytes may be fetched from the bytes in the TXT text file which have not been read into the arrays. The 994 bytes may be stored in addresses 30-1024 in the cache. The procedure may return to the step 32 until all bytes of the TXT text file have been fetched into the cache.

After searching all the bytes of the TXT text file in accordance with the above-described process, a plurality of directory byte streams may have been preliminarily searched out. Assume that the directory character streams corresponding to these directory byte streams are listed as below:

第1章
第2章
第3章
第五集团军大举进攻
第4章
第5章
第一次我们有了新的篇章
第20章

In step 35 (not shown), erroneous directory character streams in the above preliminarily obtained directory character streams can be filtered and removed.

In step 35_1, constants corresponding to predetermined directory characters "第", "章", "节", "篇", "回", and "集" may be determined as 10, 20, 30, 40, 50, and 60, respectively.

In step 35_2, for each of the directory character streams, a set of constants corresponding to all the predetermined directory characters contained therein may be determined. For example, the set of constants corresponding to the directory character stream {第一章} can be determined as {E1=10, E2=20}, the set of constants corresponding to the directory character stream {第五集围军大举进攻} can be determined as {E1=10, E2=50}, and the set of constants corresponding to the directory character stream {第一次我们有了新的篇章} can be determined as {E1=10, E2=40, E3=20}.

In step 36_2, the following equation may be used to calculate a calculation value W corresponding to each of the directory character stream:

$$W = E1 + E2 \times pow(2, \text{delta}) + \ldots + Ei \times pow(2, \text{delta} \times (i-1)),$$

where W is the calculation value corresponding to the directory character stream, pow is an exponential operation, delta is an operational factor (here, delta is 3), and Ei is a constant corresponding to the i-th predetermined directory character in current directory character stream.

For example, the calculation values corresponding to the directory character streams {第1章}, {第2章}, {第3章}, {第4章}, {第5章} ... {第20章}

$$W = 10 \times pow(2, 3 \times (2-1)) = 170.$$

The calculation value corresponding to the directory character stream {第五集围军 大举进攻} is:

$$ti\ W = 10 + 60 \times pow(2, 3 \times (2-1)) = 490.$$

The calculation value corresponding to the directory character stream {第一次我们 有了新的篇章} is:

$$\begin{aligned} W &= 10 + 40 \times pow(2, 3 \times (2-1)) + 20 \times pow(2, 3 \times (3-1)) \\ &= 10 + 40 \times 8 + 20 \times 64 \\ &= 1770. \end{aligned}$$

The following sequence of calculation values may be obtained:

170, 170, 170, 490, 170, 170, 1770 ... 170.

In step 36_3, the calculation values may be divided into intervals and a percentage of number of calculation values may be calculated for each of the intervals.

For example, the minimum value 170 and the maximum value 1770 of the sequence of calculation values may be taken as boundaries, and a length of the interval may be set as 200 for the division. The results are as follows.

In an interval [170, 370], the number of calculation values is 20, being 91% of the total number of calculation values.

In an interval [370, 570], the number of calculation values is 1, being 4% of the total number of calculation values.

In an interval [570, 770], the number of calculation values is 0.

In an interval [770, 970], the number of calculation values is 0.

In an interval [970, 1170], the number of calculation values is 0.

In an interval [1170, 1370], the number of calculation values is 0.

In an interval [1370, 1570], the number of calculation values is 0.

In an interval [1570, 1770], the number of calculation values is 1, being 4% of the total number of calculation values.

In step 36_4, a threshold value may be set as 5%. Directory character streams in the intervals in which the percentage is less than 5% may be determined as erroneous character streams and may be filtered out and removed.

For example, the directory character streams {第五集围军 大举进攻} and {第一次 我们有了新的篇章} are determined as the erroneous character streams and are filtered out. Then the filtered directory character streams may be obtained to generate the directory of the text file.

Figure 2:
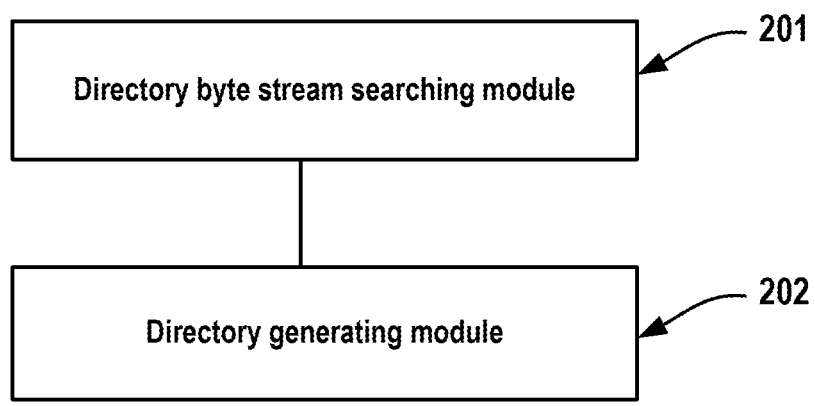
FIG. 2 is a schematic diagram illustrating an exemplary directory generation device, consistent with certain disclosed embodiments.

FIG. 2 is a schematic diagram illustrating an exemplary directory generation device, consistent with some disclosed embodiments. The device may include a processor and a memory communicatively connected with the processor. The device may include the following modules.

A directory byte stream searching module 201 may be configured to search a directory byte stream in a text file. The directory byte stream may include a predetermined directory key byte corresponding to a predetermined directory character.

A directory generating module 202 may be configured to generate a directory of the text file based on the directory byte stream. In some embodiments, the directory byte stream searching module 201 may be configured to search the directory byte stream from all bytes of the text file. In some embodiments, the directory byte stream searching module may be further configured to fetch L bytes starting from the first byte of the text file into a cache comprising L storage spaces with addresses $A_1$-$A_L$, respectively, wherein each byte may be stored in one of the storage spaces and L is a predetermined positive integer. The directory byte stream searching module 201 may be further configured to search a predetermined separator byte from the bytes currently stored in the cache and determine whether a byte stream between adjacent predetermined separator bytes contains the directory byte stream. When the last predetermined separator byte in the cache has been searched out, the address $A_N$ of the storage space corresponding to the last predetermined separator byte may be determined, and the bytes in the storage spaces with addresses $A_N$-$A_L$ may be moved into the storage spaces with addresses $A_1$-$A_{L-M+1}$ in the cache, wherein N is a positive integer and $1 \leq N \leq L$.

The directory byte stream searching module 201 may be further configured to fetch N−1 bytes from the bytes of the text file which have not been fetched into the storage spaces and store them in addresses $A_{L-N+2}$-$A_L$ in the cache.

The specific functions implemented by each module of the directory generation device may refer to the specific steps of the above-described methods for directory generation, thus the description thereof is omitted.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Moreover, it will be apparent to those skilled in the art from consideration of the specification and practice of the present disclosure that various modifications and variations can be made to the disclosed systems and methods without departing from the scope of the disclosure, as claimed. Thus, it is intended that the specification and examples be considered as exemplary only, with a true scope of the present disclosure being indicated by the following claims and their equivalents.

The invention claimed is:

1. A method, implemented by a computer, for generating a directory, comprising:
   searching, by the computer, a plurality of directory byte streams in a text file, each of the directory byte streams including a predetermined directory key byte corresponding to a predetermined directory character;
   determining a plurality of directory character streams corresponding to the plurality of directory byte streams;
   determining a set of constants {Ei| i=1, 2, 3 ... } corresponding to all characters within each of the directory character streams that matches the predetermined directory character, wherein i is a sequence number of each of the matched characters in the respective directory character stream;
   calculating a value W corresponding to each of the directory character streams by a rule of W=E1+E2×pow (2, delta) +... +Ei×pow (2, delta×(i−1)) so as to determine, based on the calculated value, that one or more of the directory character streams are erroneous directory character streams, where pow is an exponential operation, and delta is an operational factor;
   filtering the plurality of directory character streams to remove the determined erroneous directory character streams; and
   generating a directory of the text file based on the filtered plurality of directory character streams.

2. The method of claim 1, wherein searching the directory byte streams comprises:
   fetching a first amount of bytes from the text file into a cache;
   searching first and second predetermined separator bytes in the cache; and
   determining whether a byte stream between first and second predetermined separator bytes contains at least one of the directory byte streams;
   when it is determined that the byte stream between the first and second predetermined separator bytes contains at least one of the directory byte streams:
      moving a second amount of bytes that follow the second predetermined separator byte in the cache to a starting storage space of the cache; and
      fetching a third amount of bytes from the text file into the cache to fill in remaining storage spaces following the second amount of bytes that have been moved to the starting storage space of the cache.

3. The method of claim 2, further comprising:
   determining whether a number of bytes included in the byte stream between the first and second predetermined separator bytes is greater than a predetermined maximum number of directory bytes, wherein the maximum number of directory bytes is equal to a product of a pre-estimated maximum number of characters contained in a directory character stream and a maximum number of bytes corresponding to a single character in the text file; and
   determining whether the byte stream between the first and second predetermined separator bytes contains at least one of the directory byte streams after it is determined that the number of bytes included in the byte stream between the first and second predetermined separator bytes is equal to or smaller than the predetermined maximum number of directory bytes.

4. The method of claim 1, further comprising:
   skipping a preset number of bytes following the directory byte streams before moving the second amount of bytes or fetching the third amount of bytes.

5. The method of claim 4, wherein:
   when the second amount is greater than the preset number, skipping the preset number of bytes following the second predetermined separator and moving a remaining number of bytes in the cache to the starting storage space of the cache;
   when the preset number is greater than the second amount by Y bytes, skipping Y bytes in the text file and fetching the first amount of bytes following the Y bytes in the text file into the cache.

6. The method of claim 1, further comprising:
   determining an offset from at least one of the directory byte streams to a predetermined position in the text file.

7. The method of claim 6, wherein determining the offset further comprising:
   determining a total number of fetched bytes;
   determining an address value of a storage space corresponding to a first byte of the at least one of the directory byte streams stored in the cache; and
   determining the offset to be the total number of fetched bytes plus the address value less the first amount.

8. The method of claim 1, wherein the calculating further comprises:
   obtaining a sequence of values corresponding to the plurality of directory character streams;
   dividing the sequence of the values into a plurality of intervals;
   determining a number of the values that fall within each of the intervals; and
   when the number of the values within an interval is smaller than a predetermined threshold, determining that the one or more directory character streams corresponding to the one or more values within the interval is erroneous directory character stream.

9. A device for generating a directory, including:
   a processor; and
   a memory storing instructions executable by the processor, wherein the processor is configured to:
   search a plurality of directory byte streams in a text file, each of the directory byte streams including a predetermined directory key byte corresponding to a predetermined directory character;
   determine a plurality of directory character streams corresponding to the plurality of directory byte streams;
   determine a set of constants {Ei| i=1, 2, 3 ... } corresponding to all characters within each of the directory character streams that matches the predetermined directory character, wherein i is a sequence number of each of the matched characters in the directory character stream;
   calculate a value W corresponding to each of the directory character streams by a rule of W=E1+E2×pow (2, delta)+... +Ei×pow (2, delta×(i−1)) so as to determine, based on the calculated value, that one or more of the directory character streams are erroneous directory character streams, where pow is an exponential operation, and delta is an operational factor;
   filter the plurality of directory character streams to remove the determined erroneous directory character streams; and
   generate a directory of the text file based on the filtered plurality of directory character streams.

10. The device of claim 9, wherein the processor is further configured to:

fetch a first amount of bytes from the text file into a cache;
search first and second predetermined separator bytes in the cache; and
determine whether a byte stream between first and second predetermined separator bytes contains at least one of the directory byte streams;
when it is determined that the byte stream between the first and second predetermined separator bytes contains at least one of the directory byte streams:
   move a second amount of bytes that follow the second predetermined separator byte in the cache to a starting storage space of the cache; and
   fetch a third amount of bytes from the text file into the cache to fill in remaining storage spaces following the second amount of bytes that have been moved to the starting storage space of the cache.

\* \* \* \* \*